(12) United States Patent
Lin

(10) Patent No.: US 7,495,875 B2
(45) Date of Patent: Feb. 24, 2009

(54) POWER ABNORMAL PROTECTION CIRCUIT

(75) Inventor: Kuo-Fan Lin, Taoyuan Hsien (TW)

(73) Assignee: FSP Technology Inc., Taoyuan (TW)

( * ) Notice: Subject to any disclaimer, the term of this patent is extended or adjusted under 35 U.S.C. 154(b) by 71 days.

(21) Appl. No.: 11/806,935

(22) Filed: Jun. 5, 2007

(65) Prior Publication Data

US 2008/0304195 A1 Dec. 11, 2008

(51) Int. Cl.
*H02H 3/247* (2006.01)
(52) U.S. Cl. ........................................................ 361/89
(58) Field of Classification Search .................... 361/89
See application file for complete search history.

(56) References Cited

U.S. PATENT DOCUMENTS 5,765,001 A * 6/1998 Clark et al. ................. 713/340
6,445,089 B1 * 9/2002 Okui ............................ 307/66
6,949,915 B2 * 9/2005 Stanley ....................... 323/207

FOREIGN PATENT DOCUMENTS

TW 501830 9/2002

* cited by examiner

*Primary Examiner*—Michael J Sherry
*Assistant Examiner*—Ann T Hoang
(74) *Attorney, Agent, or Firm*—Muncy, Geissler, Olds & Lowe PLLC

(57) ABSTRACT

A power abnormal protection circuit includes a power detection unit, a voltage drop correction unit, a drop out detection unit, a delay unit and a delay masking unit. By detecting an input power average value of a power supply occurring of a brown out condition can be determined. The power supply includes a power factor correction unit which has an output capacitor. By detecting the voltage of the output capacitor a drop out condition can be determined. When a power abnormal condition occurs all units of the power supply can be set off sequentially according to a delay time to protect circuit elements and a connecting computer.

10 Claims, 5 Drawing Sheets

POWER ABNORMAL PROTECTION CIRCUIT

FIELD OF THE INVENTION

The present invention relates to a power abnormal protection circuit and particularly to a protection circuit to detect input power of a power supply and shut down the time series of the power supply when the input power is abnormal.

BACKGROUND OF THE INVENTION

A power supply receives AC power and converts it to steady DC power for computer operation. The general electric power users occasionally encounter a blackout or brown-out condition. Hence the present power supply usually provides protection function to guard against abnormal voltage. The abnormal conditions of AC power used in the general houses mainly can be divided into two types: one is drop out in which the voltage drops significantly and instantly from a normal value. The duration could be very short, but the voltage is excessively low or at a lower level constantly, thus the power becomes unusable. This could be caused by damage of an electric equipment or abrupt start of a greater load at the user end (such as a motor of a great capacity being started suddenly). Another type is brown out in which the voltage slowing drops below the normal voltage, and output of electric equipments also decreases until stops (such as a lamp gradually dims until fully turn-off). In the event that the foregoing two types of abnormal conditions occur, the power supply has to generate a corresponding delay and shutdown time series to protect the computer and power supply it self. R.O.C. patent publication No. 501830 entitled "Improved exchanged power supply" provides a judgment capability for abnormal voltage. It sets a delay time period for excessive low voltage (4 seconds was set in that patent). In the event that the excessive low voltage condition lasts not longer than 4 seconds, the delay unit increases the ON duration time of a switch Q11 of a power factor correction unit to keep the power supply in normal operation. And the power factor correction circuit has a capacitor C53 at an output end that maintains a constant voltage. Hence output can be maintained intact. But lengthening the ON duration time of the switch could result in overheat and burn-out of the switch Q11. Hence in the excessive low voltage condition the circuit could be damaged before the delay time of 4 seconds has elapsed. The object of protection cannot be fully accomplished. Moreover, the patent mentioned above does not take into account the condition of drop out in a very short time. As the drop out condition takes place very quickly, the technique of the previous patent cannot respond fast enough, and a voltage bouncing effect could happen on the output. This could cause damage to the computer in operation. As the conventional technique previously discussed does not provide satisfactory solution to overcome the drop out and brown out problems, there are still rooms for improvement.

SUMMARY OF THE INVENTION

In view of the conventional techniques that do not provide a protection mechanism to fully fend off various power abnormal conditions, the primary object of the invention is to provide a protection circuit to prevent damage of a power supply or a computer when drop out and brown out occur.

The invention provides a power abnormal protection circuit to control OFF time series of a power supply when an abnormal voltage occurs. The power supply includes a rectification unit, a power factor correction unit, a transformer, a main power output unit and a standby power output unit. It also includes a power factor correction control unit, a pulse width modulation (PWM) unit, a standby power control unit and the power abnormal protection circuit. The power abnormal protection circuit includes a power detection unit, a voltage drop correction unit, a drop out detection unit, a delay unit and a delay masking unit to detect the average value of input power of the power supply to determine whether a brown out condition occurs. It also detects the voltage of an output capacitor in the power factor correction unit to determine whether a drop out condition occurs. The voltage drop correction unit orders the power factor correction control unit to generate a signal to correct voltage output when the brown out condition occurs, and generates delay time to maintain operation of the power supply. Because the voltage output is corrected downwards, the duty cycle of switch elements of the power factor correction unit is shortened. Hence the passing current is lower to reduce loss in the ON duration. Moreover, drop of the voltage also can reduce switching loss of the switch elements, thus the switch elements can be protected without damaging. In the event of drop out, the drop out detection unit directly turns OFF the power factor correction unit and the PWM unit, and delays setting OFF of the standby power control unit. In order to protect the computer from being damaged by too quick of restart, the delay masking unit prevents the power factor correction control unit from being started within a selected time period, so that even if an abnormal input voltage occurs operation of the elements can be maintained or setting OFF of the elements can be accomplished according the different conditions to protect the circuit elements and computer.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
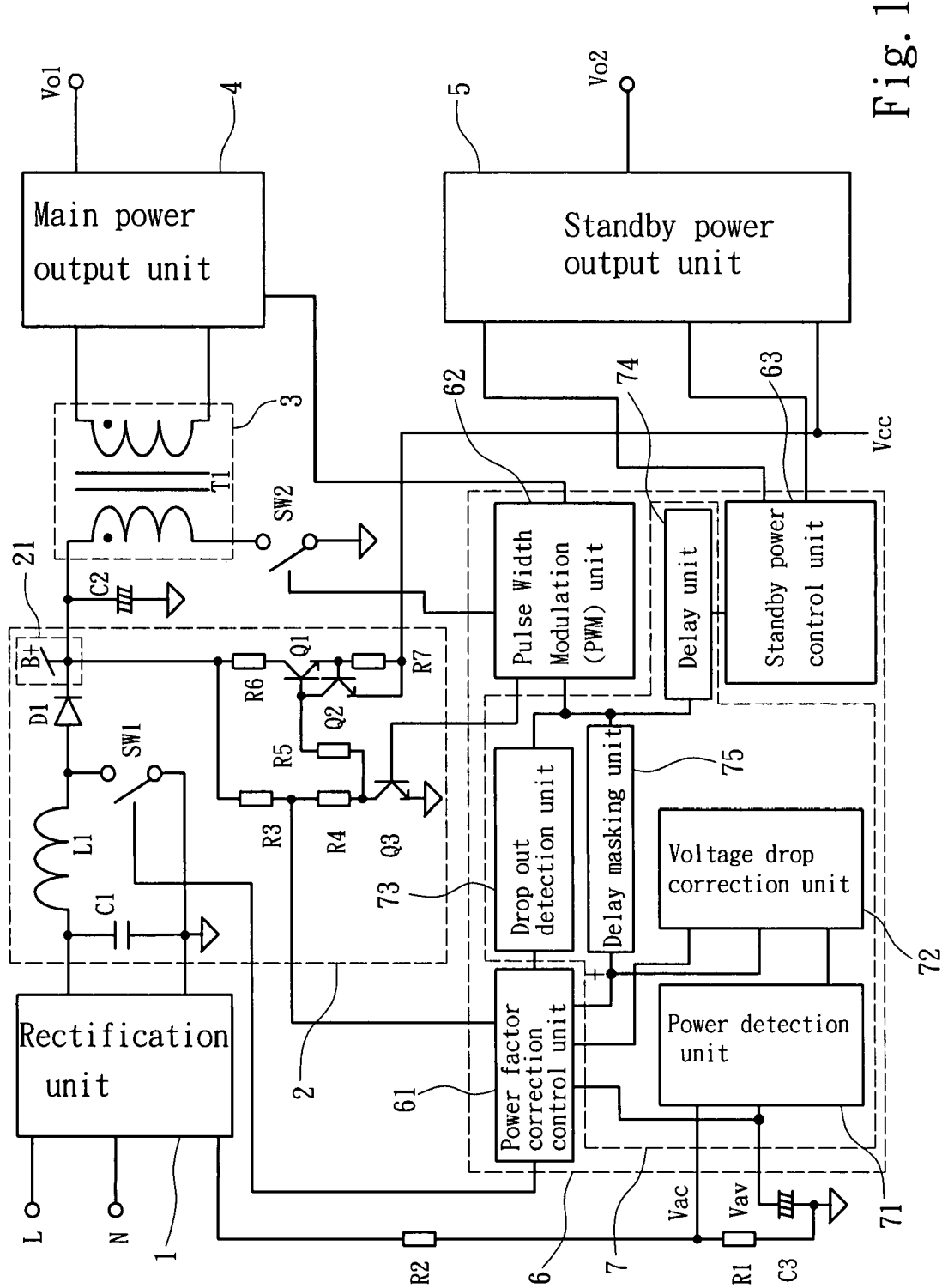
FIG. 1 is a circuit diagram of a power supply.

Please refer to FIG. 1, the invention provides a power abnormal protection circuit 7 to control OFF time series of a power supply when an abnormal voltage occurs. The power supply includes a rectification unit 1, a power factor correction unit 2, a transformer 3, a main power output unit 4 and a standby power output unit 5. The rectification unit 1 receives AC power and rectifies it to become input power Vac. The input power Vac passes through the power factor correction unit 2 so that the phase of voltage and current are adjusted, then passes through the transformer 3 to be delivered to the main power output unit 4 and the standby power output unit 5. The power factor correction unit 2 has an output capacitor 21 to maintain output voltage of the power factor correction unit 2. The power factor correction unit 2, main power output unit 4 and standby power output unit 5 are controlled respectively by a power factor correction control unit 61, a PWM unit 62 and a standby power control unit 63. The power factor correction control unit 61, PWM unit 62 and standby power control unit 63 can be integrated into an integrated circuit (IC) 6 or formed in a general circuit. In this invention the power abnormal protection circuit 7 may also be integrated into the IC 6. The power abnormal protection circuit 7 includes a power detection unit 71, a voltage drop correction unit 72, a drop out detection unit 73, a delay unit 74 and a delay masking unit 75. The power detection unit 71 receives the input power Vac and gets an input power average value Vav through a connecting capacitor C3. When the input power average value Vav is lower than an excessive low voltage judgment value, a voltage drop signal is output to the voltage drop correction unit 72. The voltage drop correction unit 72 outputs an average voltage normal signal during normal start to an actuation input end ENA1 of the power factor correction control unit 61 and is connected to the power detection unit 71. Upon receiving the voltage drop signal a reference voltage signal is generated and sent to the power factor correction control unit 61, and a first delay time T1 is generated. Within the first delay time T1 operations of all elements are maintained. If the voltage drop signal has been received continuously for a period exceeding the first delay time T1, output of the average voltage normal signal stops, and the power factor correction control unit 61 is set off. The drop out detection unit 73 gets a voltage from the output capacitor 21 and sets a stop voltage value to determine whether the voltage of the output capacitor 21 is lower than the stop voltage value. If the voltage of the output capacitor 21 is greater than the stop voltage value an input voltage normal signal is sent to the delay unit 74, delay masking unit 75 and an actuation input end ENA2 of the PWM unit 62 so that the PWM unit 62 operates in a normal condition. The delay unit 74 and the delay masking unit 75 also transfer the input voltage normal signal to an actuation input end ENA3 of the standby power control unit 63 and the actuation input end ENA1 of the power factor correction control unit 61 to make them in normal operations. The standby power control unit 63 outputs a control signal of the standby power output unit 5 (indicated by STBY waveform in FIGS. 3 and 4). The input voltage normal signal and the average voltage normal signal are added and input to the power factor correction control unit 61 to make it functional. It can be seen as if the front end of the actuation input end ENA1 of the power factor correction control unit 61 has an AND gate to receive the input voltage normal signal and the average voltage normal signal. In the event that the voltage of the output capacitor 21 is smaller than the stop voltage value, the drop out detection unit 73 stops the input voltage normal signal, and the PWM unit 62 immediately stops operation. The delay unit 74 orders the standby power control unit 63 to set off after a second delay time T2 has elapsed. The delay masking unit 75 orders immediate turning off of the power factor correction control unit 61, and not be started within a third delay time T3 and wherein the second delay time T2 is smaller than the third delay time T3. Hence OFF protection time series are formed when the power supply is in the brown out and drop out conditions.

Figure 2:
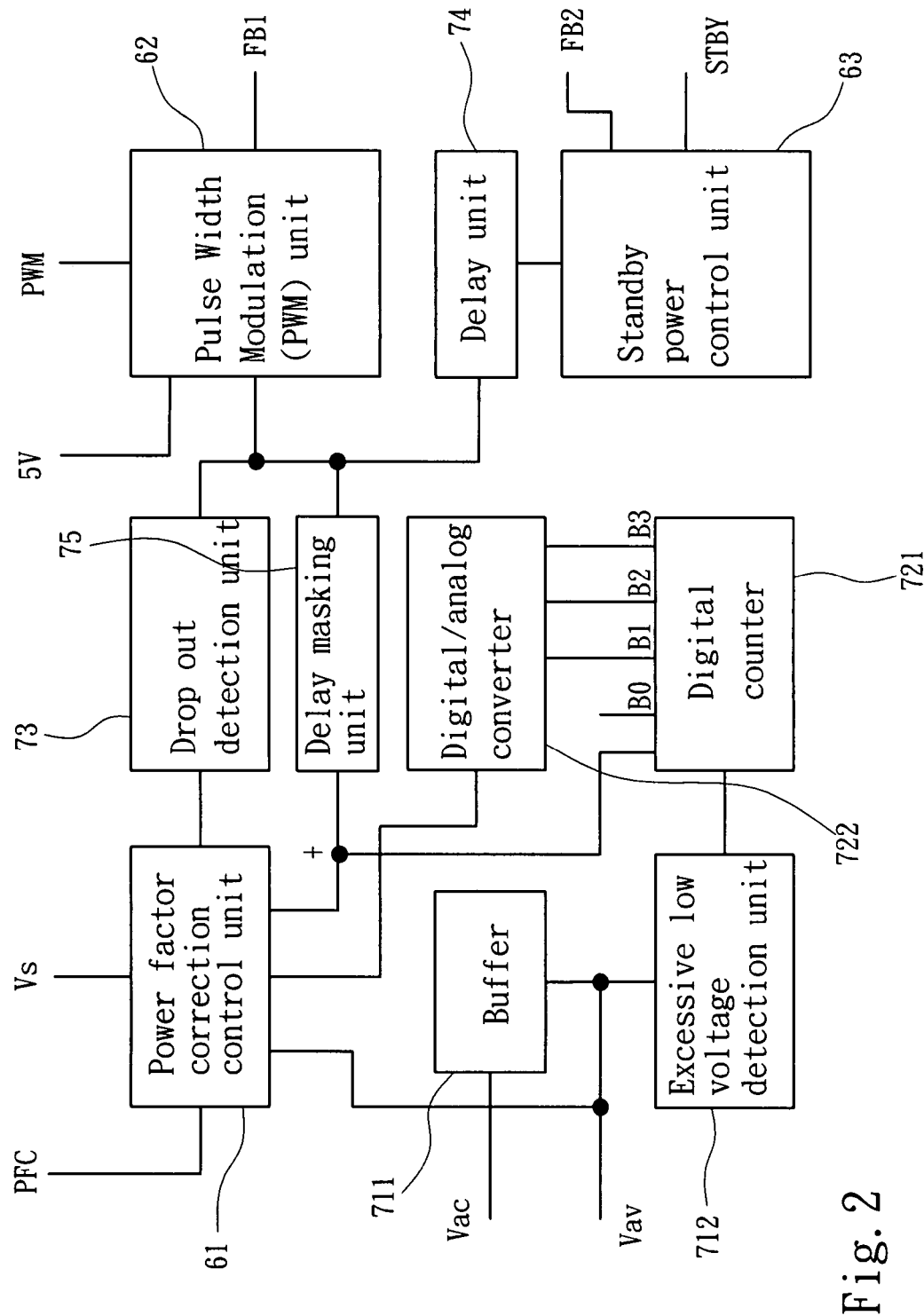
FIG. 2 is a block diagram of a first embodiment of the invention.

Refer to FIG. 2 for a first embodiment of the invention. The power detection unit 71 includes a buffer 711 and an excessive low voltage detection unit 712. The voltage drop correction unit 72 includes a digital counter 721 and a digital/analog converter 722. The buffer 711 receives the input power Vac and has an output end to generate the input power average value Vav through an external capacitor C3 at an output end thereof. The excessive lower voltage detection unit 712 contains an excessive low voltage judgment value. When the input power average value Vav is lower than the excessive low voltage judgment value the voltage drop signal is sent to the digital counter 721. The digital counter 721 has an output end to output an average voltage normal signal at normal start, and four output bits B0, B1, B2 and B3 to provide binary counting function. When the voltage drop signal is received the digital counter 721 starts counting upwards according to the frequency of a first pulse signal clk1, and the four output bits B0, B1, B2 and B3 count upwards in the binary fashion and output sequentially. The output bits B1, B2 and B2 at the higher positions are connected to the digital/analog converter 722 which receives the signals from the output bits B1, B2 and B3, and converts to analog reference voltage signal to be sent to the power factor correction control unit 61 to regulate the voltage of the output capacitor 21. Thus the load on a switch element SW1 of the power factor correction unit 2 can be reduced to prevent overloading and burn-out. The lowest output bit B0 is grounded to avoid oversensitive. When all the output bits B0, B1, B2 and B3 output a higher potential, it indicates that the digital counter 721 has reached a higher limit. Then the digital counter 721 stops delivering of the average voltage normal signal to set off the power factor correction control unit 61. The time required for the output bits B0, B1, B2 and B3 to count from zero to the upper limit is the first delay time T1. During the digital counter 721 counting upwards if the excessive voltage detection unit 712 stops sending out the voltage drop signal, and the digital counter 721 reverses counting until reaching zero according the frequency of a second pulse signal clk2. The frequency of the second pulse signal clk2 is higher than the frequency of the first pulse signal clk1 so that the speed of reversing counting to zero of the digital counter 721 is greater than the speed of counting upwards. As a result, the power factor correction control unit 61 restores the power factor correction unit 2 at a faster speed to output normal voltage. The drop out detection unit 73 is connected to the power factor correction control unit 61. Through the power factor correction control unit 61 the voltage of the output capacitor 21 is detected. And the stop voltage value is set to determine whether the voltage of the output capacitor 21 is lower than the stop voltage value. When the voltage of the output capacitor 21 is greater than the stop voltage value an input voltage normal signal is sent to the delay unit 74, delay masking unit 75 and PWM unit 62 to make the PWM unit 62 in normal operation. The delay unit 74 and the delay masking unit 75 send the input voltage normal signal to the standby power control unit 63 and the power factor correction control unit 61 to make them in normal operation. If the voltage of the output capacitor 21 is smaller than the stop voltage value the drop out detection unit 73 stops the input voltage normal signal to make the PWM unit 62 to stop operation. The delay unit 74 sets off the standby power control unit 63 after the second delay time T2 has elapsed. The delay masking unit 75 immediately sets off the power factor correction control unit 61 and prevents it from starting within the duration of the third delay time T3. Therefore when brown out and drop out occur OFF protection time series are formed for the power supply.

Figure 3:
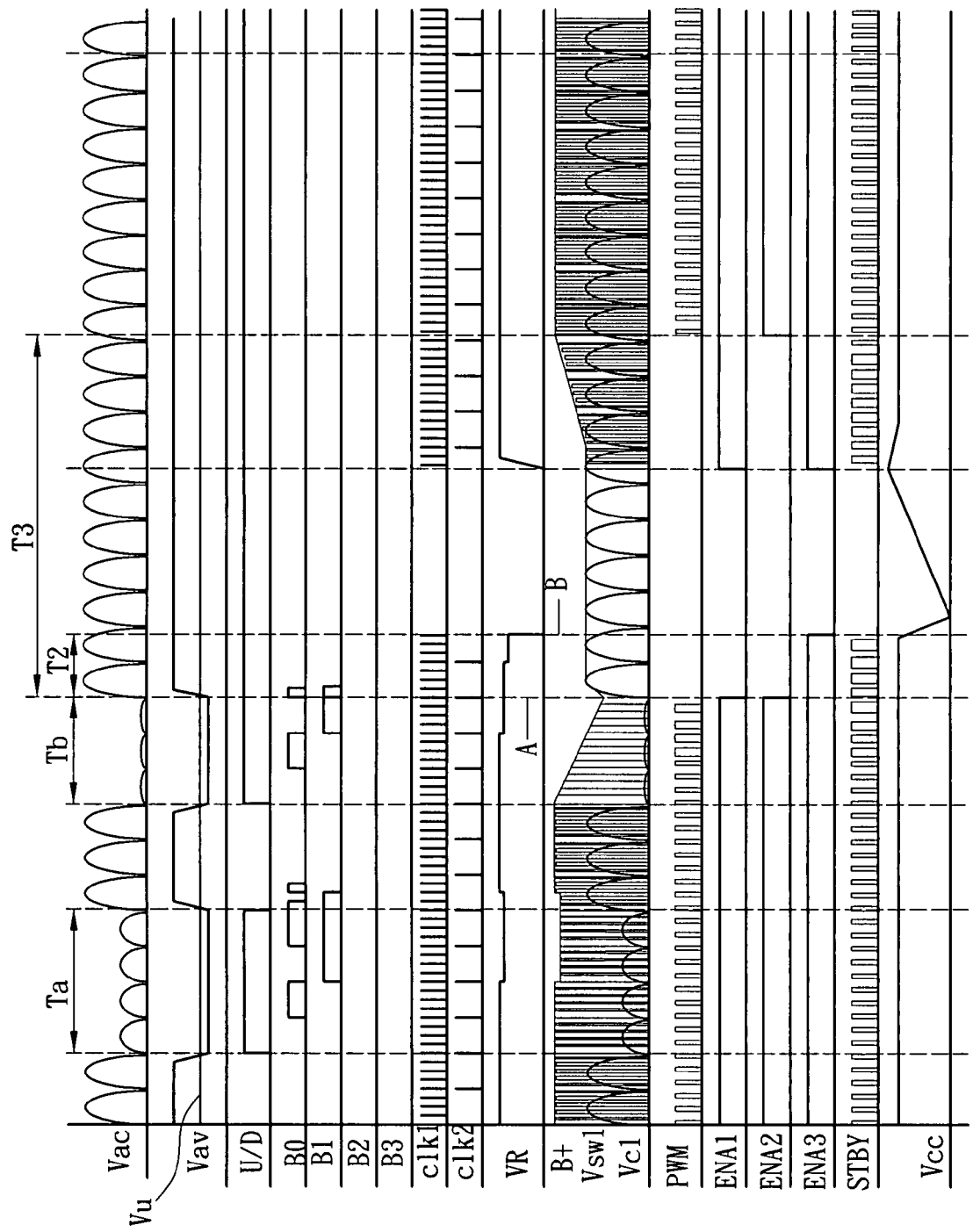
FIG. 3 is a time series waveform chart in a drop out condition.

Referring to FIGS. 2 and 3, B+ represents the voltage of the output capacitor 21. When a short brown out condition takes place while the input voltage Vac is in Ta time period, the digital counter 721 starts counting, and the digital/analog converter 722 generates a reference voltage to allow the power factor correction control unit 61 to regulate the voltage of the output capacitor 21. The speed of upward counting of the digital counter 721 is determined by the frequency of the first pulse signal clk1. After the input power Vac has been restored, the speed of reversing counting to zero of the digital counter 721 is determined by the frequency of the second pulse signal clk2. When the voltage drops greatly in a time period Tb, the voltage of the output capacitor 21 is lower than the stop voltage value set by the drop out detection unit 73 (indicated by A at the time series shown in the drawings), thus a drop out condition is determined. Meanwhile the drop out detection unit 73 stops sending of the input voltage normal signal so that the PWM unit 62 immediately stops operation. The delay unit 74 sets off the standby power control unit 63 after the second delay time T2 has been elapsed (indicated by B at the time series shown in the drawings). The delay masking unit 75 generates a mask function to prohibit the power factor correction control unit 61 from starting within the duration of the third delay time T3. The IC 6 can only starts again after the third delay time T3 has been elapsed.

Figure 4:
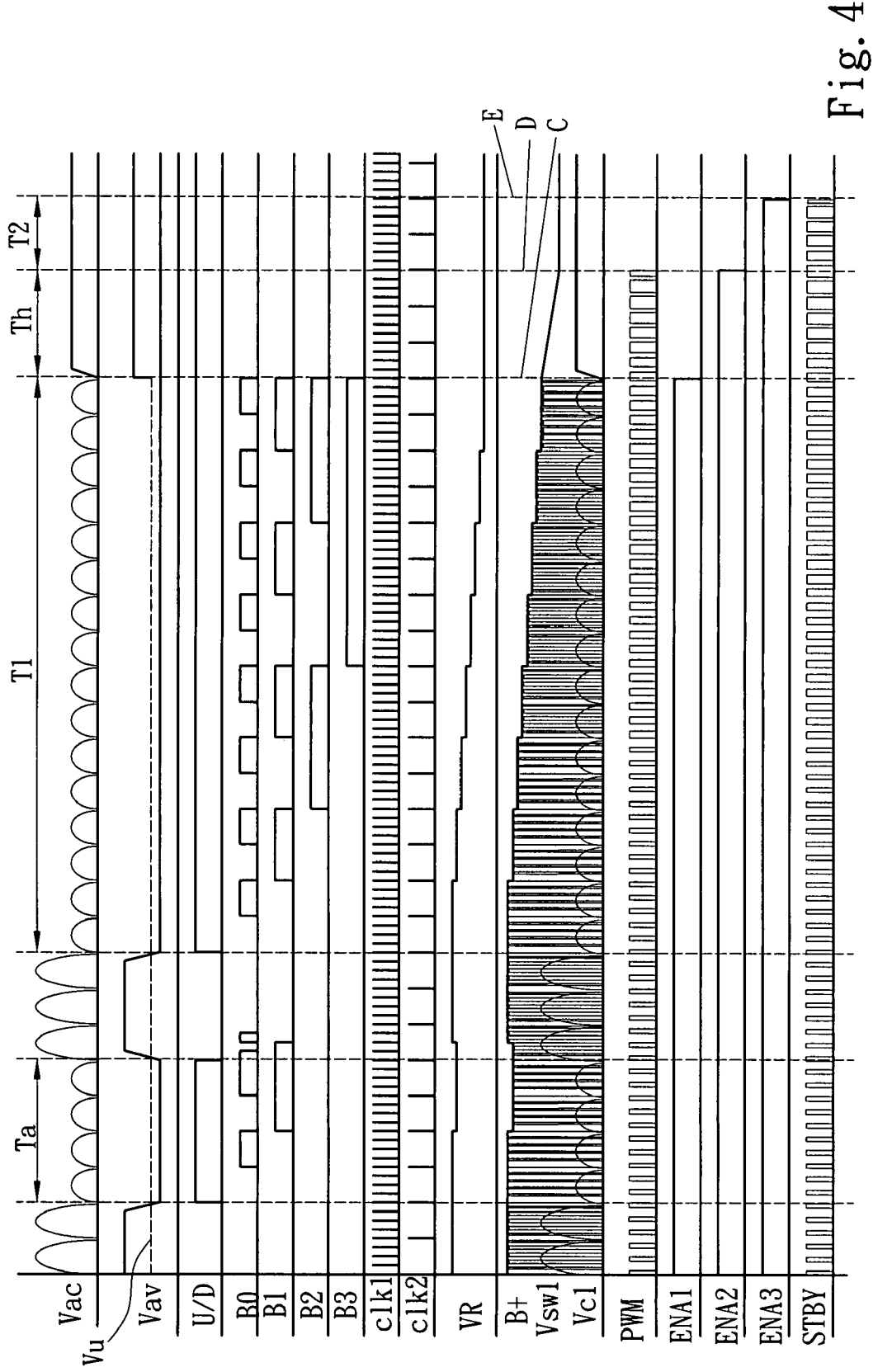
FIG. 4 is a time series waveform chart in a brown out condition.

Referring to FIGS. 2 and 4, when the input voltage average value Vav is lower than an excessive low voltage judgment value Vu set by the excessive low voltage detection unit 712, the digital counter 721 starts counting upwards, and the digital/analog converter 722 continuously corrects the reference voltage value to allow the power factor correction control unit 61 to lower the voltage of the output capacitor 21 until the first delay time T1 is elapsed and the digital counter 721 has reached the upper limit. Then the digital counter 721 stops sending the average voltage normal signal to immediately set off the power factor correction control unit 61 (indicated by C at the time series shown in the drawings). After the power factor correction control unit 61 is set off the power factor correction unit 2 also stops operation. Hence the voltage of the output capacitor 21 decreases. After a period of time Th, the voltage of the output capacitor 21 drops and reaches the stop voltage value set by the drop out detection unit 73 (indicated by D at the time series shown in the drawings). After the second delay time T2 has elapsed the standby power control unit 63 is turned off (indicated by E at the time series shown in the drawings). Thus the invention provides sufficient buffer time to allow the lower voltage to rise without damaging the elements. After the buffer time has elapsed all the elements are set off sequentially. During the third delay time T3 the power factor correction control unit 61 does not start to avoid the power supply from being started or stopped too quickly to cause errors in the computer system.

Figure 5:
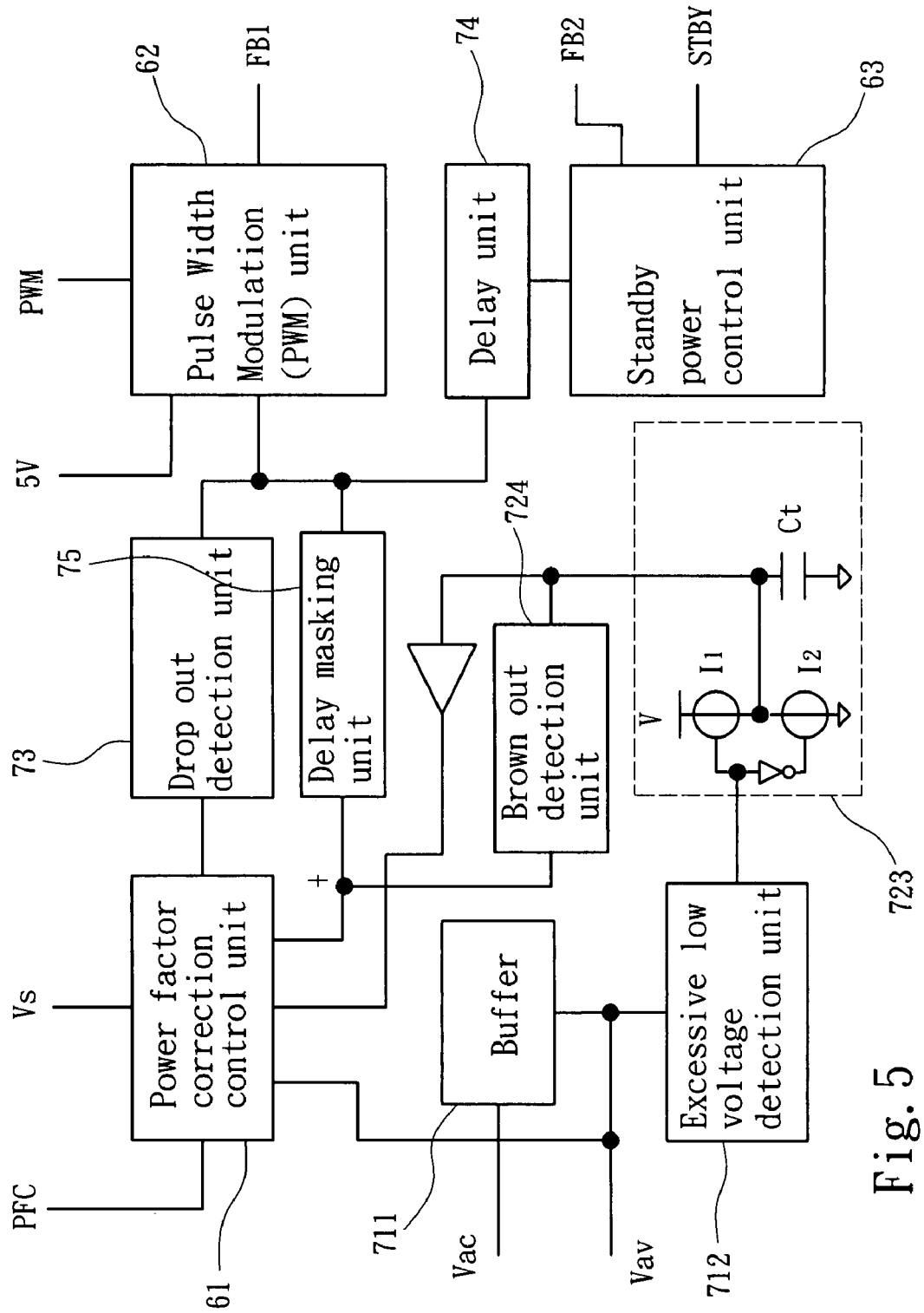
FIG. 5 is a block diagram of a second embodiment of the invention.

Referring to FIG. 5, the voltage drop correction unit 72 may be formed through a slope generator 723 and a brown out detection unit 724. The slope generator 723 includes a first current source, a second current source and an integration capacitor Ct. The voltage drop signal is connected to the first current source and the second current source at the same time to control ON/OFF of the first current source and the second current source. The second current source is connected to a NOT GATE at one side to allow the start time series of the first current source and the second current source to be formed alternately. The integration capacitor Ct bridges the first current source and the second current source. When the first current source starts, the integration capacitor Ct is charged. When the second current source starts, the integration capacitor Ct discharges. Through charging and discharging of the integration capacitor Ct the reference voltage signal in a sloped shape is formed. During normal start the brown out detection unit 724 outputs the average voltage normal signal and sets a low voltage detection value. When the excessive low voltage detection unit 712 outputs the voltage drop signal to make the first current source in operation, the integration capacitor Ct is charged to form the sloped shape reference voltage signal. The elapsed time in which the reference voltage signal rises to the low voltage detection value is the first delay time T1. When the reference voltage signal rises and reaches the low voltage detection value the brown out detection unit 724 stops sending the average voltage normal signal to set off the power factor correction control unit 61. When the voltage drop signal vanishes, the first current source is set off and the second current source is set on. The second current source makes the integration capacitor Ct to charge so that the sloped shape reference voltage signal decreases to become zero. And output of the second current source is greater than the output of the first current source. Hence discharging speed of the integration capacitor Ct is faster than the charging speed. As a result, the power factor correction control unit 61 makes the power factor correction unit 2 to resume normal voltage output at a faster speed.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A power abnormal protection circuit to control OFF time series of a power supply when an abnormal voltage occurs, the power supply receiving an input power which passes through a rectification unit, a power factor correction unit and a transformer and is sent to a main power output unit and a standby power output unit, the power factor correction unit having an output capacitor to maintain an output voltage for the power factor correction unit, the power supply further including a power factor correction control unit, a pulse width modulation (PWM) unit, a standby power control unit and a power abnormal protection circuit, the power factor correction control unit controlling operation of the power factor correction unit, the PWM unit and the standby power control unit controlling respectively the main power output unit and the standby power output unit, the power abnormal protection circuit comprising:

a power detection unit to receive the input power and get an input power average value and output a voltage drop signal when the input power average value decreases;

a voltage drop correction unit which outputs an average voltage normal signal to the power factor correction control unit when the input power average value is normal, and is connected to the power detection unit and receives the voltage drop signal when the input voltage average value decreases to generate a reference power signal which is sent to the power factor correction control unit, and continuously receives the voltage drop signal until a first delay time has elapsed then stops sending the average voltage normal signal to set off the power factor correction control unit;

a drop out detection unit which receives the voltage of the output capacitor and sets a stop voltage value, and determines whether the voltage of the output capacitor is smaller than the stop voltage value; when the voltage of the output capacitor is greater than the stop voltage value an input voltage normal signal is sent to a delay unit, a delay masking unit and the PWM unit to make the PWM unit in normal operation, the delay unit and the masking delay unit sending the input voltage normal signal to the standby power control unit and the power factor correction control unit so that they are set in normal operation; when the voltage of the output capacitor is smaller than the stop voltage value the drop out detection unit stops sending the input voltage normal signal to make the PWM unit to stop operation, the delay unit setting off the standby power control unit after a second delay time has elapsed, the delay masking unit immediately setting off the power factor correction control unit which does not start within a third delay time period so that OFF protection time series of the power supply is formed in brown out and drop out conditions.

2. The power abnormal protection circuit of claim 1, wherein the second delay time is smaller than the third delay time.

3. The power abnormal protection circuit of claim 1, wherein the power detection unit includes a buffer and an excessive low voltage detection unit, the buffer receiving the input power and generating the input power average value, the excessive low voltage detection unit sending out the voltage drop signal when the input power average value decreases.

4. The power abnormal protection circuit of claim 3, wherein the excessive low voltage detection unit contains an excessive low voltage judgment value to be compared with the input power average value, and outputs the voltage drop signal when the input power average value is lower than the excessive low voltage judgment value.

5. The power abnormal protection circuit of claim 1, wherein the voltage drop correction unit includes a digital counter and a digital/analog converter, the digital counter generating a high level voltage during normal start to become the average voltage normal signal, and starting counting upon receiving the voltage drop signal, the counting value being sent to the digital/analog converter to be converted to the reference voltage signal; the digital counter stopping output of the average voltage normal signal when the counting thereof reaches a upper limit; the digital counter counting reverse to zero when the voltage drop signal vanishes.

6. The power abnormal protection circuit of claim 5, wherein the speed of the digital counter is determined by the frequency of a first pulse signal, and the speed of the reverse counting to zero is determined by the frequency of a second pulse signal.

7. The power abnormal protection circuit of claim 6, wherein the frequency of the second pulse signal is greater than that of the first pulse signal.

8. The power abnormal protection circuit of claim 1, wherein the voltage drop correction unit includes a slope generator and a brown out detection unit, the slope generator receiving the voltage drop signal and generating a sloped wave to serve as the reference voltage signal; the brown out detection unit sending out the average voltage normal signal during normal start and setting a low voltage detection value; when the sloped reference voltage signal rises to the low voltage detection value the brown out detection unit stops sending the average voltage normal signal; the slope generator decreasing the slope after the voltage drop signal vanishes.

9. The power abnormal protection circuit of claim 8, wherein the slope generator includes a first current source, a second current source and an integration capacitor; the voltage drop signal being connected to the first current source and the second current source and controlling ON/OFF of the first current source and the second current source; the second current source being connected to a NOT GATE to set start time series of the first current source and the second current source in an alternate fashion; the integration capacitor bridging the first current source and the second current source; charging of the integration capacitor being started when the first current source is started; the integration capacitor starting discharging when the second current source is started; charging and discharging of the integration capacitor forming the sloped reference voltage signal.

10. The power abnormal protection circuit of claim 9, wherein output of the second current source is greater than output of the first current source.

* * * * *